United States Patent [19]
Noodleman

[11] 3,979,821
[45] Sept. 14, 1976

[54] METHOD OF MANUFACTURING RARE EARTH PERMANENT MAGNET ROTOR

[75] Inventor: Samuel Noodleman, Blacksburg, Va.

[73] Assignee: Kollmorgen Corporation, Hartford, Conn.

[22] Filed: June 16, 1975

[21] Appl. No.: 586,909

Related U.S. Application Data

[63] Continuation-in-part of Ser. No. 576,125, May 9, 1975, which is a continuation-in-part of Ser. No. 502,213, Aug. 30, 1974, Pat. No. 3,937,993, which is a continuation-in-part of Ser. No. 471,313, May 20, 1974, Pat. No. 3,876,892, which is a continuation-in-part of Ser. No. 383,883, July 30, 1973, Pat. No. 3,819,964.

[52] U.S. Cl. .................................. 29/598; 29/418; 148/108; 310/42; 310/156
[51] Int. Cl.² ........................................ H02K 15/02
[58] Field of Search .................... 29/596, 598, 418; 310/42, 156, 153, 261; 148/103, 108; 252/62.55; 335/284

[56] References Cited

UNITED STATES PATENTS

| | | | |
|---|---|---|---|
| 2,696,567 | 12/1954 | Madle | 29/598 X |
| 3,628,239 | 12/1971 | Hunt et al. | 310/156 X |
| 3,802,935 | 4/1974 | Martin et al. | 148/108 X |
| 3,836,802 | 9/1974 | Parker | 310/154 |

*Primary Examiner*—Carl E. Hall
*Attorney, Agent, or Firm*—Morgan, Finnegan, Pine, Foley & Lee

[57] ABSTRACT

A rotor containing rare earth magnet material which can be assembled, machined and then magnetized. A stack of laminations is built up, pieces of virgin rare earth magnet material are inserted in the slots provided therefor in the laminations, the laminations with the rare earth magnet material are cast with aluminum, the cast rotor is machined and the rare earth magnet material is then magnetized. The strength of the rare earth magnets in the rotor may be adjusted after magnetization thereof.

10 Claims, 13 Drawing Figures

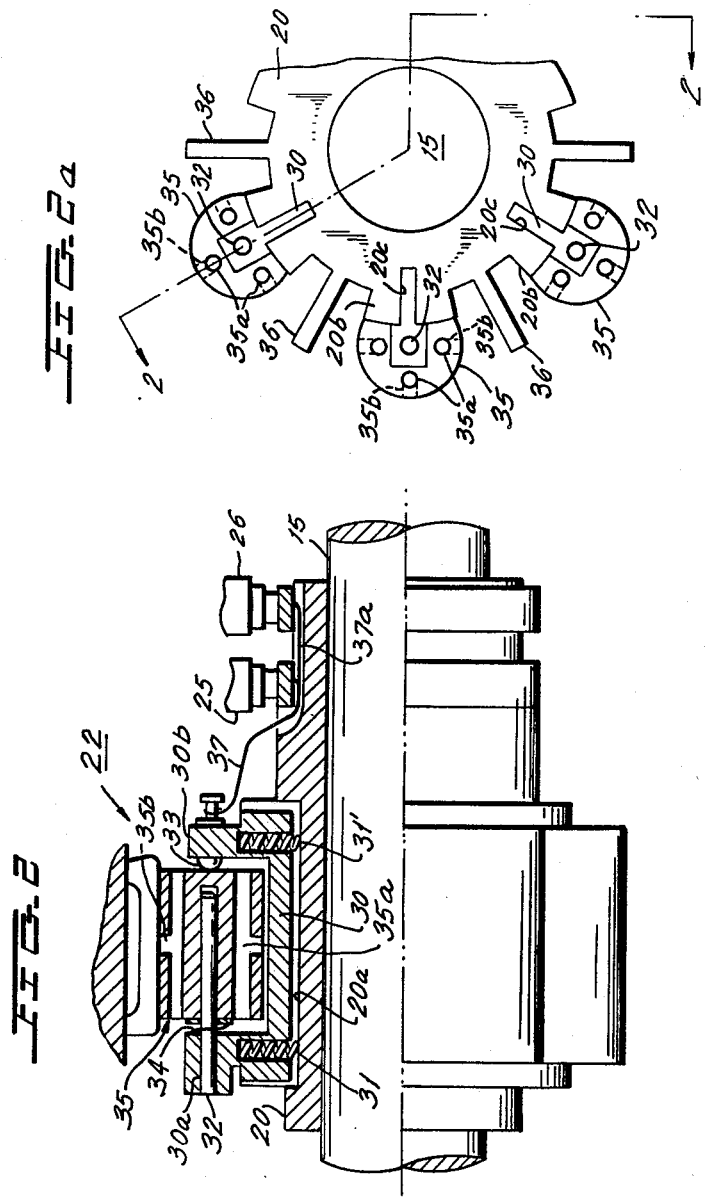

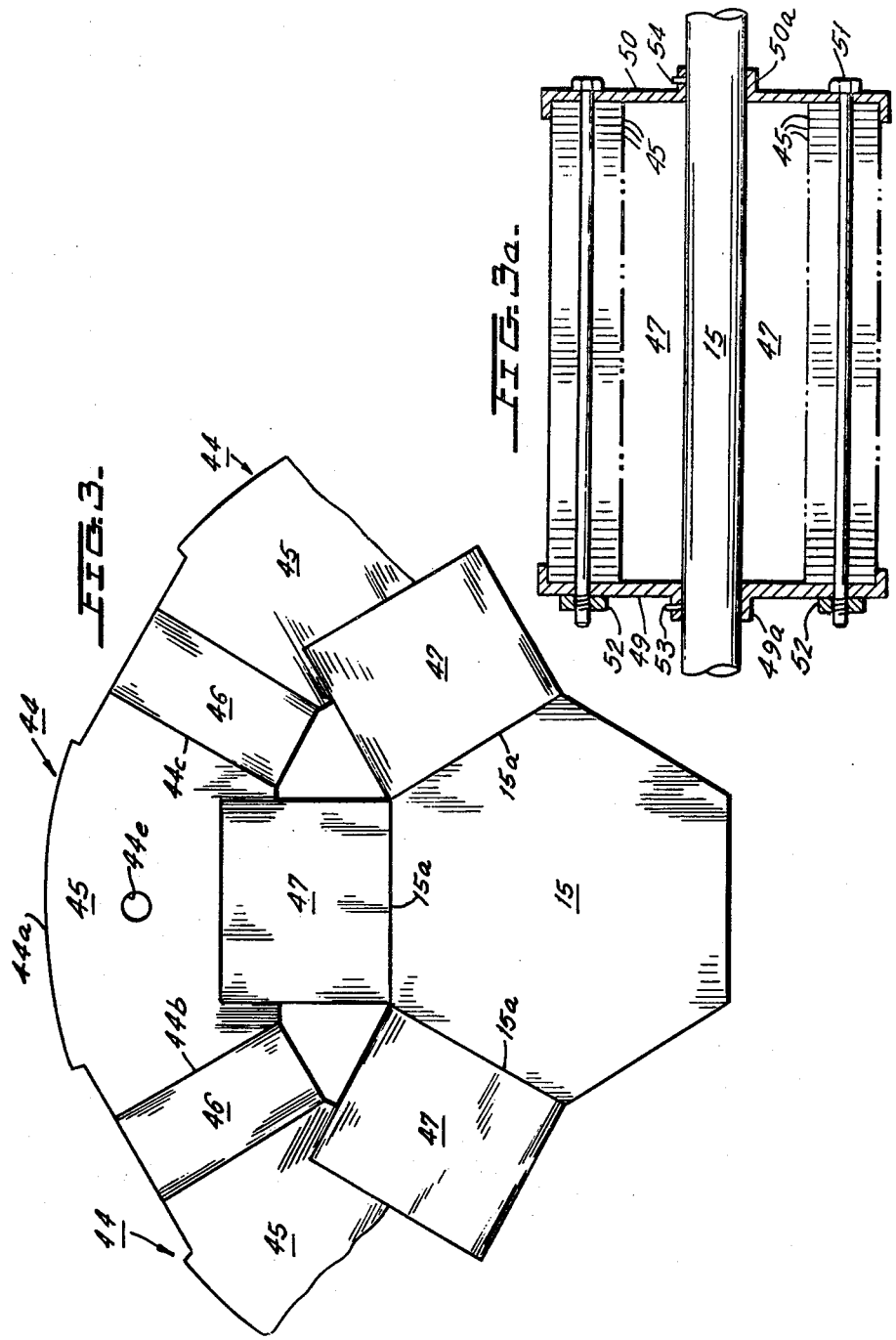

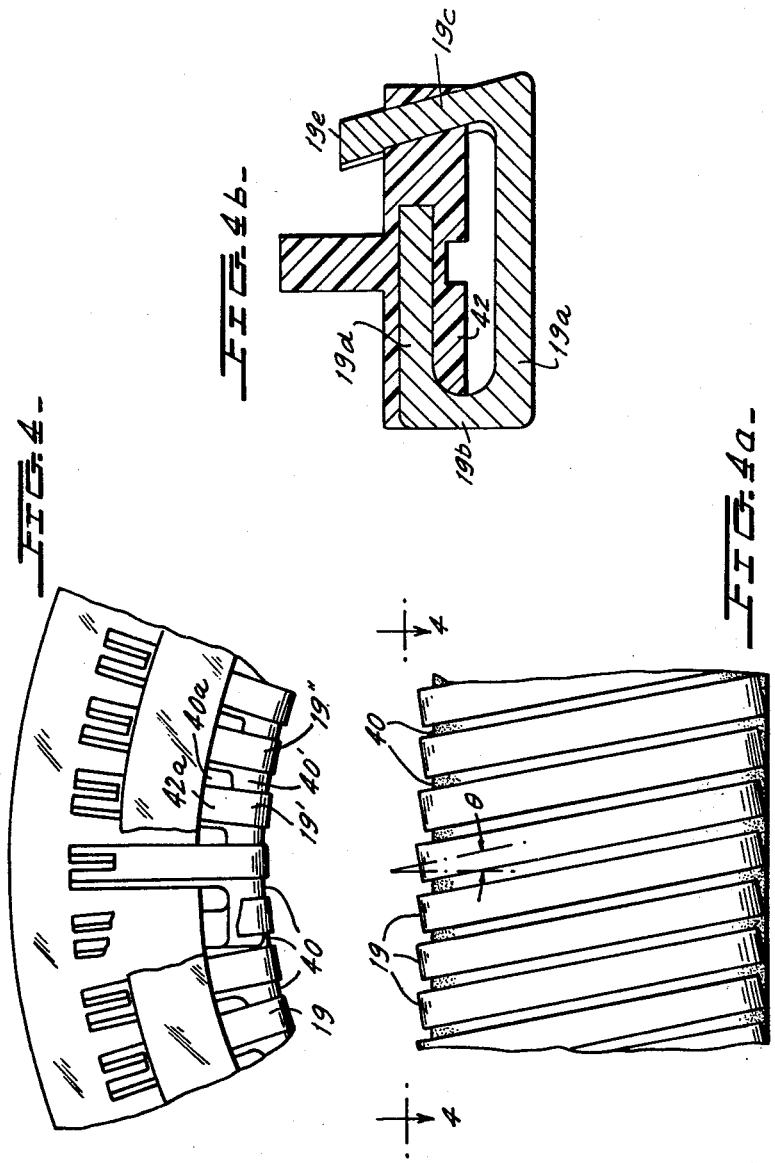

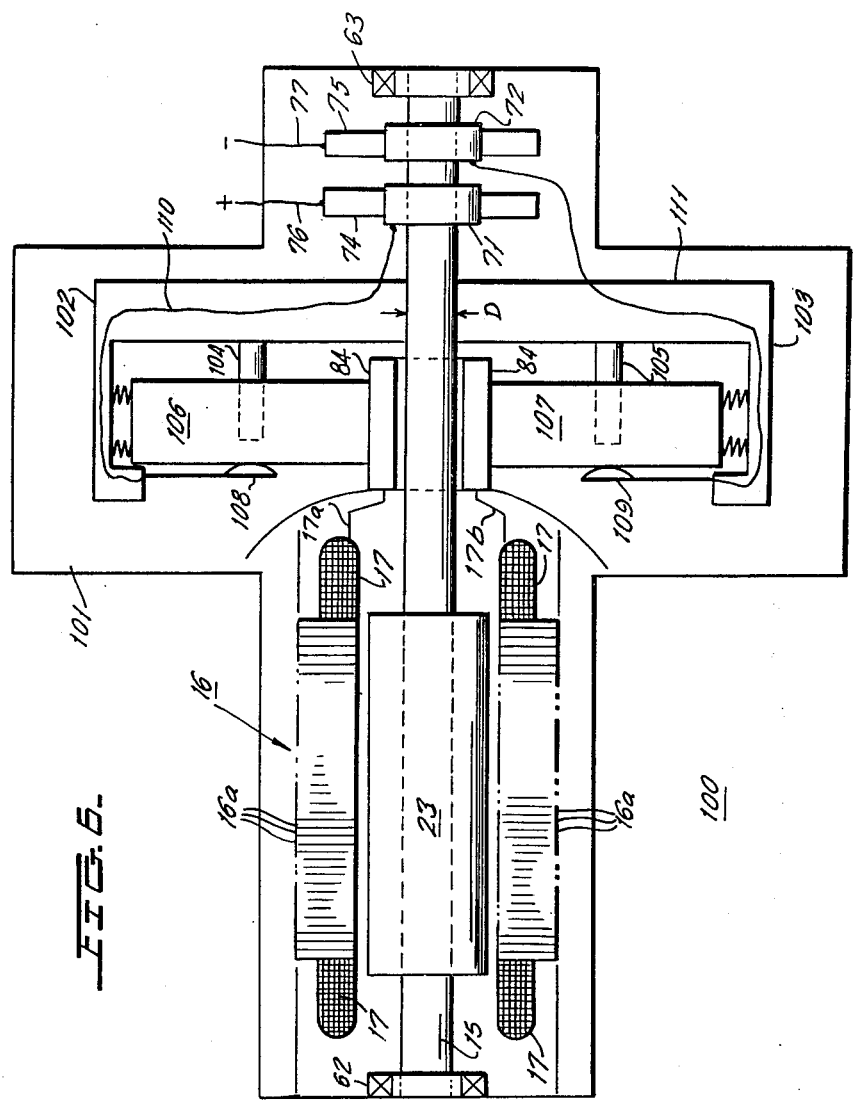

METHOD OF MANUFACTURING RARE EARTH PERMANENT MAGNET ROTOR

This application is a continuation-in-part of my application Ser. No. 576,125 filed May 9, 1975 which in turn is a continuation-in-part of my application Ser. No. 502,213 filed Aug. 30, 1974, now U.S. Pat. No. 3,937,993, which in turn is a continuation-in-part of my application Ser. No. 471,313 filed May 20, 1974, now U.S. Pat. No. 3,876,892, which in turn is a continuation-in-part of my application Ser. No. 383,883 filed July 30, 1973, now U.S. Pat. No. 3,819,964.

BACKGROUND AND BRIEF DESCRIPTION OF THE INVENTION

DC motors of the "inside-out" design typically comprise a permanent magnet rotor and a number of stator-mounted, electrically energizeable coils, the ends of which are connected to an array of commutator bars. Commutation may be effected by means of rollers as shown by my previously-identified applications and patents or conventional brush commutation techniques may be employed, for example a face plate or disc-type system as disclosed in Goraszko U.S. Pat. No. 3,275,861.

Traditionally, the permanent magnet members of DC motors of both conventional and inside-out designs have been alnico or ceramic magnets. Following the advent of rare earth magnets, with their extremely high energy product and intrinsic coercive force, Rollin James Parker suggested in U.S. Pat. No. 3,836,802 that they be combined with alnico magnets in the stator of a conventional DC motor. In several of my previously-identified applications I have shown how rare earth magnets could be combined with conventional magnets to enhance the flux density in the air gap of a DC motor of the inside-out design.

Rare earth magnets, as such, are very difficult to work with because of the extremely strong fields they create. Thus, one of their greatest virtues is at the same time one of their greatest liabilities. It is simply not practical to machine rare earth magnets or structures containing such magnets because the machined particles adhere so strongly to the magnets. Because of the extremely high coercive forces of rare earth magnets it is also not practical to construct a rotor or stator of rare earth magnets and then remagnetize the structure as is commonly done with alnico magnets. Once again, one of the greatest virtues of rare earth magnets, i.e., the extremely high resistance to demagnetization, is also one of the greatest liabilities.

Rare earth magnets are not generally available in the sizes of conventional magnets, i.e., they are typically furnished in the size of about ½ inch × ½ inch × 1 inch or smaller. When used with conventional magnets as part of a permanent magnet rotor in a DC motor of the inside-out design as shown in my earlier-identified applications they are glued to the rotor structure, a less than satisfactory mechanical bonding arrangement for high speed operation.

Applicant has overcome these and other difficulties associated with the use of rare earth magnets and has provided a rotor containing rare earth magnet material, which rotor can be magnetized after assembly and machining. Applicant has also developed a method for manufacturing such a rotor comprising the steps of: (1) assembling a stack of steel rotor laminations having slots adapted to receive pieces of rare earth magnet material; (2) inserting pieces of virgin rare earth magnet material in the slots; (3) positioning a shaft in the center of the stack; (4) casting a rotor comprising the laminations, the rare earth magnet material and the shaft with aluminum; (5) machining the rough-cast rotor; and (6) then magnetizing the rare earth magnet material in situ. The strength of the rare earth magnets may be adjusted or "trimmed" by heating the rotor in the absence of iron which would complete the flux path of the rare earth magnets, thereby reducing the strength of the field. The strength of the rare earth magnets can then be increased by magnetizing in the same direction as that used to originally magnetize the virgin rare earth magnet material in the cast rotor.

The rotor of the present invention, because of its ruggedness, structural integrity, high magnetic field and resistance to demagnetization, can be used for generators, synchronous machines and other electromagentic machines required to convert electrical energy to mechanical energy or vice versa.

BRIEF DESCRIPTION OF THE DRAWINGS

FIG. 2a is a partial end view of the roller contact assembly of FIG. 2;

FIG. 3 is an end view of the rotor permanent magnet assembly of FIG. 1; FIG. 3a is a side view of the permanent magnet assembly of FIGS. 1 and 3 illustrating the manner of assembly;

FIG. 4 is a partially sectionalized end view of a molded commutator array;

FIG. 4a is a partial front view of the commutator bar array of FIG. 4;

FIG. 4b shows a detailed sectional view of one bar of the commutator bar array of FIG. 4;

FIG. 6 is a simplified diagrammatic view of a DC machine for use in high speed operation;

FIG. 7 is a partially sectionalized detail view of another roller contact assembly for use with the machine of FIG. 1;

FIG. 8b is a sectional view of a machined, cast rotor of the present invention employing the lamination of FIG. 8a.

DETAILED DESCRIPTION

Figure 1:
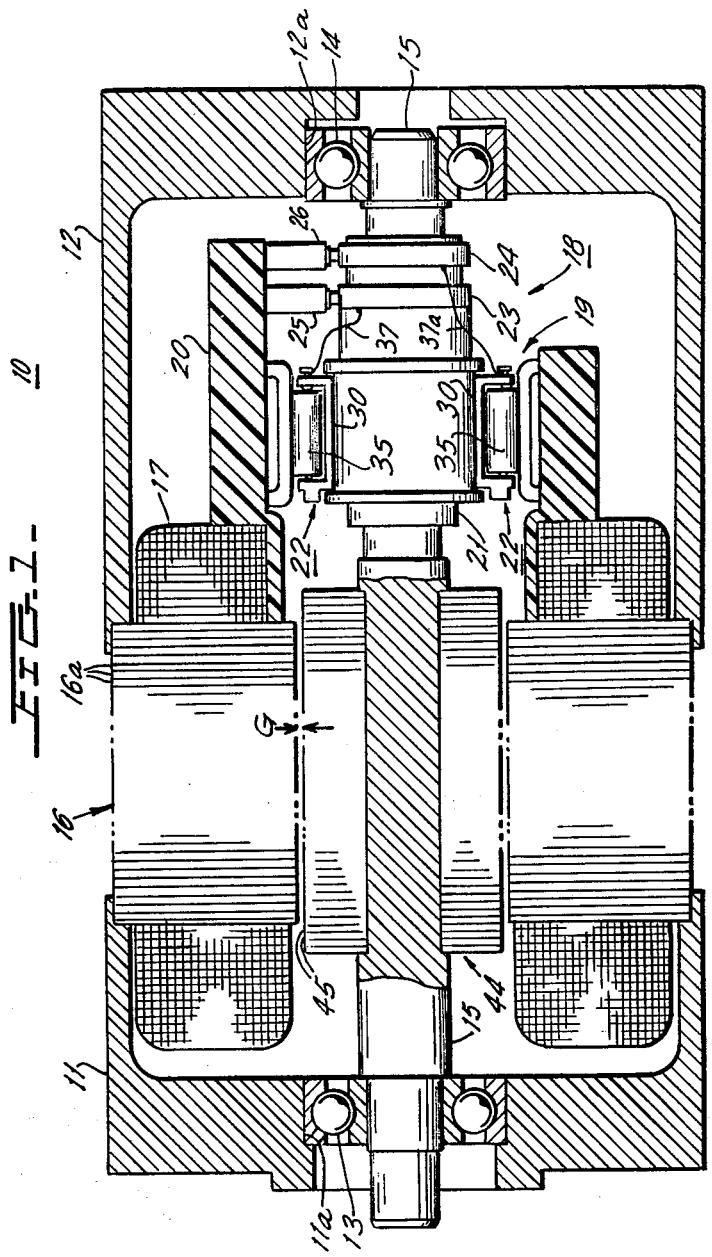
FIG. 1 is a sectional view of a DC machine of the "inside-out" type.

FIG. 1 shows an inside-out DC motor 10 which is comprised of housing members 11 and 12 which are each provided with openings 11a and 12a for receiving bearings 13 and 14 which surround a rotatably mounted rotor shaft 15. The inner ends of housing members 11 and 12 are hollow and are contoured or otherwise formed to receive and support the stator and rotor assemblies.

The stator assembly is comprised of a laminated core 16 formed of individual laminations 16a. The stator winding is comprised of a plurality of coils 17 (not shown in detail for purposes of simplicity) which, when energized, create magnetic fields in the stator core which interact with the magnetic fields set up in the rotor assembly to effect rotor rotation.

Housing member 12 is further adapted to receive the commutator assembly 18 which includes a plurality of commutator bars 19 mounted in radial fashion (see FIGS. 4–4b) within annular-shaped molded insulating material 42. Selected ones of the commutator bars are electrically connected to the end terminals of associated stator coils. As shown in FIG. 4a, the commutator bars 19 are skewed at a small angle θ so that a roller contact moving left to right with respect to FIG. 4a will effect a make-before-break contact with the commutator bars. In addition, skewing the commutator bars provides a smooth rolling surface for the roller contact so that it will mate smoothly with the inside surface of the commutator.

As shown in FIG. 1, the rotor assembly comprises a permanent magnet array secured to shaft 15. The outer periphery of the permanent magnet array lies a small, spaced distance from the interior periphery of the stator core 16 to form a hollow, annular-shaped air gap G therebetween.

Figure 2:
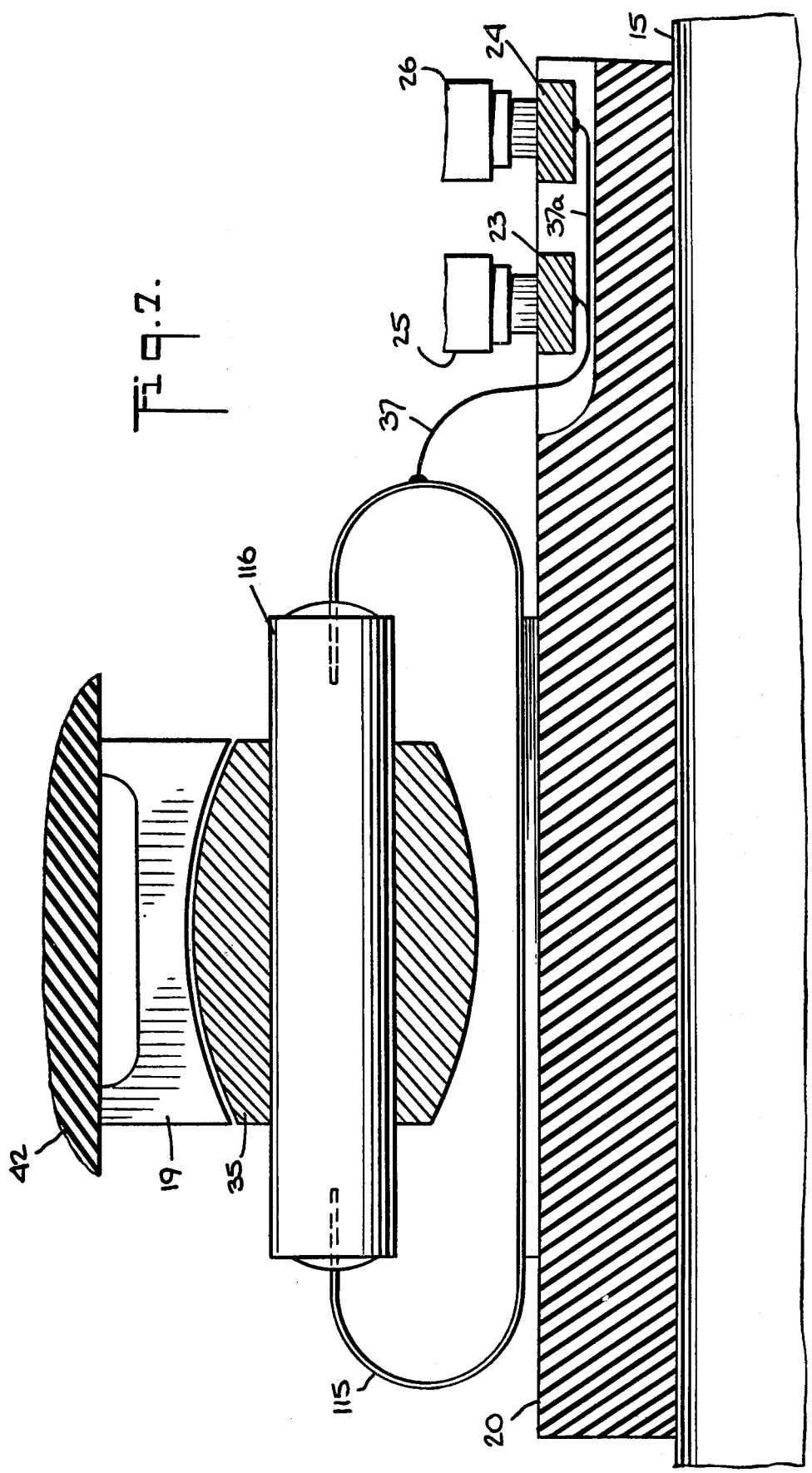
FIG. 2 is a partially sectionalized detail view of the roller contact assembly of FIG. 1.

Referring now to FIGS. 2–2a, the details of roller contact assemblies 22 will be explained. Unitary insulating sleeve 20 is mounted on rotor shaft 15 (see also FIG. 1) and has an annular recess 20a for positioning floating roller platform 30 which is resiliently mounted to sleeve 20 by springs 31 and 31'. Support arms 30a and 30b respectively support roller shaft 32 and contact 33. Spring 34 urges roller 35 towards contact 33. In the event of excessive wear, that portion of roller 35 bearing against contact 33 may be fitted with a plug of highly conductive, low resistance material. The arms 30a and 30b are slidably supported by the slots 20c provided in upright supports 20b arranged at spaced intervals about sleeve 20.

Conductive roller 35 is provided with hollow elongated passageways 35a parallel to the rotating axis and which extend to both sidewalls of the roller. The passageways communicate with radially aligned passageways 35b which open onto the cylindrical surface of the roller.

Fan blades 36 are molded into sleeve 20 and are interspersed between adjacent pairs of rollers.

Sleeve 20 supports continuous brush rings 23 and 24, each of which is electrically connected to selected ones of the roller assemblies 22 by flexible conductors 37, 37a. Brushes 25 and 26 are spring loaded and mounted upon the stator assembly. They engage brush rings 23 and 24 respectively. The brushes are, in turn, connected to opposite polarities of a DC power source (not shown). While depicted in FIG. 1 as disposed to one side of the roller contact assemblies 22, brush rings 23 and 24 may be positioned on opposite sides of the roller contact assemblies, if desired.

The rolling engagement between rollers 35 and the bars 19 of the commutator array rotates the rollers creating a centrifugal force which causes air to be drawn into the side openings of passageways 35a and urged out of radial passageways 35b. The rapidly moving air blows dust and/or other conductive particles away from the commutator array. Blades 35 serve the same function.

Rollers 35 of roller contact assemblis 22 progressively rollingly engage the commutator bars 19 while brushes 25 and 26 wipingly engage conductive rings 23 and 24, whereby the electrical path extends from one terminal of the DC source to brush 25, brush ring 23, flexible conductor 37, contact 33, conducting roller 35 and the commutator bars 19. The opposite polarity of the DC source is coupled to brush 26, brush ring 24, flexible conductor 37a a roller (spaced from roller 35 of FIG. 2) and commutator bars 19. The end terminals of the stator winding are thus progressively energized and the magnetic field generated thereby interacts with the magnetic field of the rotor permanent magnet structure to sustain rotation.

The commutator bar array of FIGS. 4–4b contributes to the blower action by providing gaps 40 between adjacent bars 19. Each commutator bar has a roller contact portion 19a and upright arms 19b and 19c. Arm 19b extends inwardly at 19d to secure commutator bar 19 to insulating material 42. Terminals of the stator windings are connected to commutator bars 19 at 19e. The bars 19 are embedded in an insulating material 42 which extends partially into each gap 40 and engages one wall of each bar. For example, molded portion 40a engages one sidewall of bar 19' and is spaced from the adjacent sidewall of bar 19''. Particles falling into gap 40' and collecting in the bottom-most portion are prevented from creating an electrical path between bars 19' and 19'' due to the presence of molded insulating portion 40a. The blower action created by fan blades 38 and/or rollers 35 keep gaps 40' clear of particles.

FIGS. 3 and 3a show the rotor permanent magnet structure in greater detail. The permanent magnet structure comprises a plurality of laminated iron pole piece assemblies 44 each having individual pole pieces 45 (see also FIG. 1) and each having an arcuate outer periphery and radially aligned sides 44b and 44c. Each pole piece is provided with an opening 44e. The sidewalls of laminated assemblies 44 are embraced by solid rectangular-shaped permanent magnets 46.

Rotor shaft 15 has a hexagonal-shaped cross section extending the length of the permanent magnet assembly and is preferably formed of a magnetic material such as, for example, soft iron. Elongated rectangular-shaped permanent magnets 47 are positioned in pole pieces 45 and an associated surface 15a of rotor shaft 15. The magnets 46 are preferably rare-earth magnets which resist demagnetizaton, provide better impedance matching and serve to increase flux density across the air gap G (see FIG. 1). Magnets 47 are preferably Alnico-8 magnets. The magnet members 46, 47 and 46 embrace pole pieces 45 and serve to concentrate the flux density in the air gap G.

FIG. 3a shows the manner of assembly of the rotor permanent magnet structure. End caps 49 and 50, rods 51 and fastening nuts 52 hold the permanent magnet assembly together. Set screws 53 and 54 engage tapped openings in collar portions 49a and 50a of the end caps 49 and 50 to lock the assembly to shaft 15.

Figure 5:
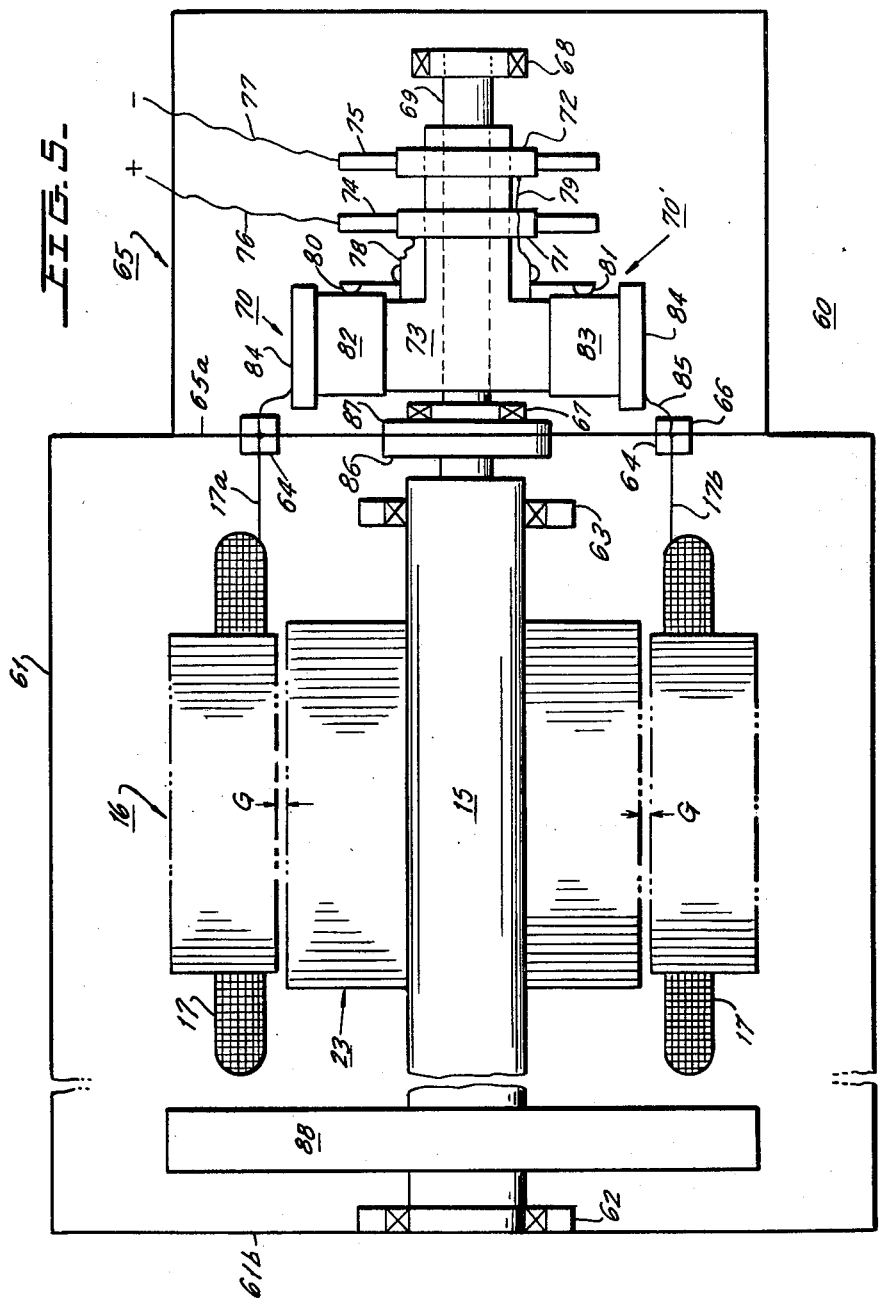
FIG. 5 is a simplified diagrammatic view of a DC machine of modular design.

FIG. 5 shows a DC machine 60 of modular design comprised of a hermetically sealed housing 61 having internally mounted bearings 62 and 63 for rotatably mounting shaft 15. The permanent magnet assembly 23, which is preferably of the type shown in FIGS. 3 and 3a, is mounted upon rotor shaft 15. The stator assembly has a laminated core 16 comprised of individual laminations 16a. The stator winding is comprised of a plurality of coils 17 (not shown in detail) which, when energized, create magnetic fields in the stator core which interact with the magnetic fields set up by the rotor permanent magnet assembly to effect rotor rotation. The end terminals 17a and 17b of the stator coils are led out of the hermetically sealed housing and terminate at a hermetically sealed terminal assembly 64 molded into side face 61a of housing 61.

A second housing 65 has molded or otherwise provided along one side wall 65a a mating terminal assembly 66 which is releasably inserted into terminal assembly 64. Housing 65 is provided with bearing assemblies 67 and 68 for rotatably mounting shaft 69. Roller contact assemblies such as, for example, 70 and 70' and brush rings 71 and 72 are mounted on insulating sleeve 73 which encircles shaft 69. Stationary mounted brushes 74 and 75 are secured within housing 65 and respectively wipingly engage rings 71 and 72. Opposite polarities of a DC source are electrically connected to brushes 74 and 75 by conductors 76 and 77 which extend between brushes 74 and 75 and the exterior of housing 65. Flexible conductors 78 and 79 electrically connect brush rings 74 and 75 to spring loaded contacts 80 and 81 which engage roller contacts 82 and 83 respectively.

Roller contacts 82 and 83 are preferably of the type shown in FIGS. 2 and 3 and operate to sequentially rollingly engage stationary mounted commutator bars 84 mounted within housing 65 and which are preferably of the type shown in FIGS. 4–4b. The commutator bars are selectively coupled to the stator coils 17 through conductors 85, terminal assemblies 66 and 64 and conductors 17a–17b. A permanent magnet member 86 is secured to rotor shaft 15 and is positoned in housing 61 immediately adjacent side wall 61a. A second permanent magnet member 87 is secured to shaft 69 and is positioned in housing 65 immediately adjacent side wall 65a and adjacent to member 86.

In operation, the DC source is progressively and sequentially coupled to coils of the stator-mounted hermetically sealed housing 61 through leads 76–77, brushes 74–75, brush rings 71–72, conductors 78–79, contacts 80–81, conductive rollers 82–83, commutator bars 84, leads 85–86, terminal assemblies 66 and 64 and conductors 17a–17b. The magnetic fields created by coils 17 interact with the fields of the permanent magnet structure 23 in air gap G to effect rotation. The rotation of shaft 15 rotates magnetic member 86. The magnet coupling between members 86 and 87 imparts rotation to shaft 69 causing the roller contact assemblies 70–70' and commutator bars 84 to progressively switch DC power to succesive stator coils.

Hermetically sealed housing 61 keeps the rotor and stator assemblies, which are practically wear-free, safe from contamination by dust or dirt. Housing 65, however, is designed to be accessible for servicing. Alternatively, housing 65 may comprise a replaceable unit. While housing 61 is shown as containing the load 88 driven by rotor shaft 15, rotor shaft 15 may extend beyond the left-hand side wall 61b of housing 61 and an appropriate seal may be provided to keep the housing interior hermetically sealed. The magnetic member 86 may also be eliminated and instead rotor shaft 15 extended beyond the right-hand side wall 65a upon providing a similar seal. The magnet member 87 of shaft 69 may then be eliminated and replaced by keying means on the left-hand end of shaft 69 for locking shaft 69 to rotate with rotor shaft 15.

FIG. 6 shows a DC motor 100 adapted for use in high speed applications. It comprises a housing 101 which contains bearings 62 and 63 for rotor shaft 15 which has a permanent magnet assembly 23 mounted thereon. The stator comprises a laminated core 16 having individual laminations 16a. The stator coils 17 are electrically connected to selected commutator bars 84 by leads 17a–17b. A pair of brush rings 71 and 72 are mounted upon rotor shaft 15 and are respectively wipingly engaged by brushes 74 and 75. Leads 76 and 77 electrically connect brushes 74 and 75 to opposite polarities of a DC source.

Roller support assemblies 102 and 103 support roller contact shafts 104 and 105 which rotatably mount conductive rollers 106 and 107. Spring mounted contacts 108 and 109 are secured to supports 102 and 103 and electrically connect brush rings 71 and 72 to rollers 106 and 107 by conductors 110 and 111. The bars 84 of the commutator array are secured in stationary fashion and are selectively connected to end terminals of the stator coils 17 by leads 17a–17b. Conductive rollers 106 and 107, which may be of the type shown in detail in FIGS. 2 and 2a, rollingly engage the outer peripheries of commutator bars 84.

The diameter of rotor shaft 15 is made as small as practical under the commutator array while the outer diameter of conductive rollers 106 and 107 is made as large as practical. This arrangement, in one preferred embodiment, reduces the angular velocity of the conductive rollers to less then one-half the angular velocity of rotor shaft 15, thereby providing a motor design which is advantageous for use in applications requiring high speed rotation. Since the distance traveled rollers 106 and 107 during one revolution of rotor shaft 15 is $2 \pi$ times the outer diameter of the commutator bar array, then for the angular velocity of rollers 106 and 107 to be less than the angular velocity of rotor shaft 15 the diameters of rollers 106 and 107 must be greater than the outer diameter of the commutator bar array.

It has been discovered in connection with the roller commutating systems of the type disclosed in my U.S. Pat. No. 3,819,964 and in FIGS. 1, 2, 5 and 6 herein that if the longitudinal axis of the roller contact is not parallel to the longitudinal axis of the rotor then substantial forces are generated which tend to drive the roller along its longitudinal axis until slippage occurs between the roller contact and the commutator bar array. Indeed, at higher rotational speeds when the centrifugal force on the roller is greater and the roller is pressed harder against the commutator bar array the forces tending to drive the roller along its axis are increased. To overcome this difficulty a novel roller commutating system has been devised whereby both the roller and the commutator bar array are contoured in complementary fashion so as to contain the travel of the roller while ensuring continued electrical contact therebetween.

This novel commutating system is illustrated in FIG. 7 wherein the same numerals designate the same parts previously described in connection with FIGS. 1, 2 and 4. Attached to sleeve 20 is a flat, conducting spring 115 which may be formed from a beryllium-copper alloy. Flexible conductor 37 connects spring 115 with brush ring 23. Attached to spring 115, e.g., by soldering, is a conducting tube 116 which also may be formed from a beryllium-copper alloy. Roller contact 35 is fitted over conducting tube 116 and is free to rotate thereon. The outer surface of roller 35 is curved and mates with the complementary curved inner surface of commutator bars 19. In this manner the roller is free to "rock" about its axis while maintaining contact with the commutator bars. Although not shown for purposes of simplicity, roller 35 has passageways for blowing dust and dirt from the commutator bars as shown in FIGS. 2 and 2a and the commutator bars 19 have the configuration shown in FIGS. 4, 4a and 4b. In addition, FIG. 7 illustrates but one of several pairs of similar roller commutating assemblies which sequentially couple opposite polarities of the DC source to pairs of commutator bars connected to the ends of individual windings.

Figure 8A:
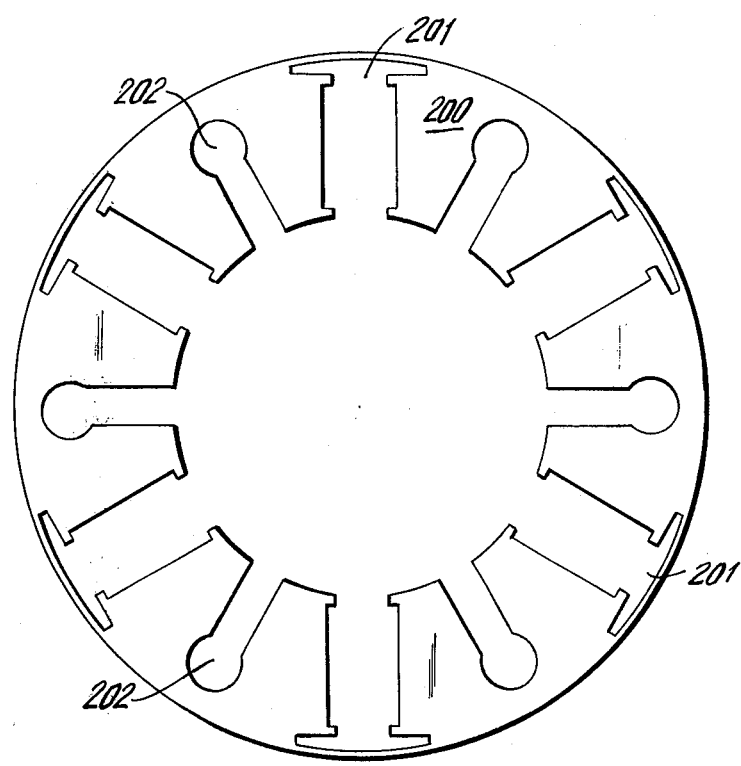
FIG. 8a is a top view of a rotor lamination for use in the present invention.

Turning now to FIG. 8a there is shown full scale a rotor lamination 200 preferably of 1010–1020 steel and about 0.02 inches thick. Lamination 200 has a first set of equally spaced openings 201 adapted to receive pieces of rare earth magnet material. Lamination 200 also has a second set of equally spaced openings 202 adapted to receive non-ferrous casting material, preferably molten aluminum, during the casting step. Each of the first set of openings has lips or flanges adapted to retain the pieces of rare earth magnet material.

In manufacturing the rare earth magnet rotor of the present invention a stack of laminations 200 of desired size, for example 4 inches, is assembled in a mold. Next, the pieces of rare earth magnet material are inserted into the slots 201 to build up a column the height of the stack of the laminations. The pieces of rare earth magnet material are typically 0.5 inches by 0.8 inches by 0.4 inches so that, in the present illustrative embodiment, 10 pieces of the rare earth magnet material would be required to fill each of the slots 201. The rare earth magnet material employed is preferably a cobalt-rare earth intermetallic compound, the preparation of such compounds and magnets therefrom being disclosed in Benz U.S. Pat. Nos. 3,655,463, 3,655,464, 3,695,945 and Benz et al U.S. Pat. No. 3,684,593. The rare earth magnet material for use in the present invention must be "virgin", i.e., it must be processed so as not to contain any significant magnetic field. It is permissible, however, if the rare earth magnet material possess very weak residual magnetic fields due, for example, to the presence of the earth's magnetic field during formation of the virgin rare earth magnet material. If the rare earth magnet material is not virgin then the extremely high coercive force of this material renders impractical developing sufficient flux densities to alter the magnetization thereof in situ, after casting.

Rather than assembling a complete stack of laminations followed by filling up the slots 201 with pieces of rare earth magnet material, the formation of the stack and insertion of the pieces of rare earth magnet material may proceed intermittantly. The order is not critical and is merely a matter of choice.

After the laminations and pieces of rare earth magnet material have been assembled a shaft is preferably positioned at the center of the array, the longitudinal axis of the shaft being coincident with the longitudinal axis of the stack of laminations. The shaft may be of ferrous material such as steel.

The assembly comprising the laminations, the pieces of virgin rare earth magnet material and the rotor shaft is now ready for casting using a non-ferrous material, preferably aluminum because of its light weight, low cost, high strength and high melting point. The molten aluminum flows into the center section of the stack of laminations and into the second set of slots 202, thereby rendering rigid the rotor structure. It also locks the pieces of virgin rare earth magnet material into the slots 201 and has the effect of reducing any retained residual magnetism possessed by the rare earth magnet material. Finally, it makes the rotor shaft an integral part of the rotor structure.

Figure 8B:
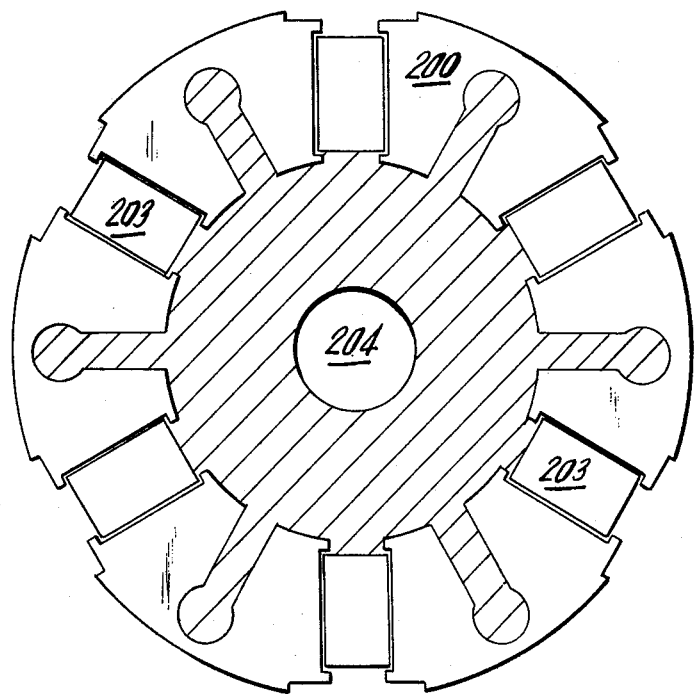

After casting, the rotor is machined so as to remove those portions of the laminations radially aligned with the slots 201, thereby forming a plurality of separate pole pieces equally spaced around the rotor. FIG. 8b shows in cross section the machined, cast rotor. The slots 201 are now filled with pieces of virgin rare earth magnet material 203 while the slots 202 are filled with aluminum, which surrounds the rotor shaft 204.

The cast rotor with the virgin rare earth magnet material is now ready for magnetization. This virgin rare earth magnet material can be saturated with between about 12,000 and about 18,000 oersteds to develop a field strength of between about 9,000 and about 12,000 gauss. These low values may be employed because the rare earth magnet material is in a virgin state. The particular values selected depend on the type of rare earth magnet material used. The fact that the rare earth material is magnetized in situ in the cast rotor places certain constraints on the design of the rotor structure. For example, the rotor pole pieces should be formed from laminations, otherwise the eddy current losses during magnetization would be too great. Moreover, there must be sufficient iron available to carry the flux so as to saturate the pieces of rare earth magnet material. Thus, the poles must contain more iron than is necessary to carry the flux out from the rare earth magnets into the stator during operation of the motor. The amount of iron required in the poles also depends upon the geometry of the pieces of rare earth magnet material. The longer the dimension of the rare earth magnet material in the radial direction, the more pole section area that is required. Accordingly, to ensure proper magnetization of the rare earth magnet material the rotor sections should have an area adequate to provide full saturation to the innermost radial portions of the rare earth magnet material. Thus, the rotor pole secton area may be 1.5 times that necessary to carry the flux out from the rare earth magnets into the stator during motor operation. Depending on the geometry of the rare earth magnet material, the area may be 2 to 3 times greater, or more.

After magnetization the field strength of the rare earth permanent magnets may be adjusted or "trimmed" by heating the rotor structure in the absence of significant amounts of ferrous material so that flux path will not be completed. Thus, the rotor structure is in an air-stabilized condition with as low a B/H as practical, e.g., 0.5. This is because the per cent of irreversible magnetic loss in rare earth magnets with increasing temperature is a function of the B/H slope and the lower the slope the sharper the fall-off of both B and H with temperature. The rare earth magnets in the rotor structure can be magnetized to increase their magnetic field up to any portion of the maximum flux by remagnetizing, provided that the magnetizing fixture is positioned so that it energizes the poles in the same direction as during initial magnetization.

The invention disclosed and claimed herein is not limited to the specific mechanism and techniques herein shown and described since modifications will undoubtedly occur to those skilled in the art. Hence, departures may be made from the form of the instant invention without departing from the principles thereof.

What I claim is:

1. A method of manufacturing a cast, rare earth permanent magnet rotor comprising the steps of:

a. assembling a stack of rotor laminations of ferrous material, said laminations having first and second sets of openings;
b. inserting pieces of virgin rare earth magnet material in said first set of openings in said laminations;
c. pouring non-ferrous casting material into said second set of openings in said laminations so as to form a rough-cast rotor assembly;
d. machining said rough-cast rotor assembly to form a rotor assembly having discrete pole pieces; and then
e. magnetizing said pieces of virgin rare earth magnet material.

2. The method of claim 1 comprising the additional step of positioning a rotor shaft within said stack of laminations, said shaft having its longitudinal axis coincident with the longitudinal axis of said stack of rotor laminations prior to the step of pouring said casting material.

3. The method according to claim 1 comprising the additional steps of heating said cast, rare earth permanent magnet rotor in an air-stabilized condition and remagnetizing in the original direction so as to adjust the field strength of said rare earth permanent magnets.

4. A method of manufacturing a cast, rare earth permanent magnet rotor comprising the steps of:
a. assembling a stack of laminations of ferrous material, said laminations having a plurality of equally spaced, structurally connected rotor pole portions with openings therein as well as slots formed by adjacent rotor pole portions;
b. inserting pieces of virgin rare earth magnet material in said slots formed by said adjacent rotor pole portions;
c. pouring non-ferrous casting material into said openings in said rotor pole portions so as to form a rough-cast rotor assembly;
d. machining said rough-cast rotor assembly so as to remove the structural connections between adjacent rotor pole portions and form discrete pole pieces; and then
e. magnetizing said pieces of virgin rare earth magnet material.

5. A method of manufacturing a cast, rare earth permanent magnet rotor comprising the steps of:
a. assembling a stack of rotor laminations of ferrous material, said laminations having a plurality of equally spaced rotor pole portions with openings therein as well as slots formed by adjacent rotor pole portions;
b. inserting pieces of virgin rare earth magnet material in said slots formed by said adjacent rotor pole portions;
c. pouring non-ferrous casting material into said openings in said rotor pole portions so as to form a rough-cast rotor assembly;
d. machining said rough-cast rotor assembly so as to form a rotor assembly having discrete pole pieces; and then
e. magnetizing said pieces of virgin earth magnet material with between about 12,000 and about 18,000 oersteds to develop a field strength of between about 9,000 and about 12,000 gauss.

6. The method of claim 5 comprising the additional steps of heating said cast, rare earth permanent magnet rotor in an air-stabilized condition and remagnetizing in the original direction so as to adjust the field strength of said rare earth permanent magnets.

7. A method of manufacturing a cast, rare earth permanent magnet rotor comprising the steps of:
a. assembling a stack of rotor laminations of ferrous material, said laminations having a plurality of equally spaced, structurally connected rotor pole portions with openings therein as well as slots formed by adjacent rotor pole portions;
b. inserting pieces of virgin rare earth magnet material in said slots formed by said adjacent rotor pole portions;
c. pouring non-ferrous casting material into said openings in said rotor pole portions so as to form a rough-cast rotor assembly;
d. machining said rough-cast rotor assembly so as to remove the structural connections between adjacent rotor pole portions and form discrete pole pieces; and then
e. magnetizing said pieces of virgin rare earth magnet material with between about 12,000 and about 18,000 oersteds to develop a field strength of between about 9,000 and about 12,000 gauss.

8. The method of claim 7 wherein said casting material comprises molten aluminum.

9. The method of claim 7 comprising the additional step of positioning a rotor shaft within said stack of laminations, said shaft having its longitudinal axis coincident with the longitudinal axis of said stack of rotor laminations prior to the step of pouring said casting material.

10. The method of claim 7 comprising the additional steps of heating said cast, rare earth permanent magnet rotor in an air-stabilized condition and remagnetizing in the original direction so as to adjust the field strength of said rare earth permanent magnets.

* * * * *